United States Patent Office 2,817,656
Patented Dec. 24, 1957

2,817,656

PROCESS OF COPPERING DISAZO DYESTUFFS

Don W. Bissell, Hamburg, N. Y., assignor to Allied Chemical & Dye Corporation, New York, N. Y., a corporation of New York No Drawing. Application August 3, 1953
Serial No. 372,176

8 Claims. (Cl. 260—148)

This invention relates to an improvement in the process of producing copper-containing disazo dyestuffs from disazo dyestuffs of the 3,3′-dialkoxy-4,4′-bis(hydroxy-sulfo-naphthylazo)-biphenyl type by heating with a coppering agent whereby the alkyl groups of the alkoxy radicals are split off and replaced by copper.

It relates more particularly to improvements in the process of coppering certain dyestuffs of said type, namely, that class of disazo dyestuffs of the 3,3′-dialkoxy-4,4′-bis(hydroxy-sulfo-naphthylazo)-biphenyl type in which one of the hydroxy-sulfo-naphthylazo radicals is a 2-azo-1-hydroxy-3-sulfo-6-naphthylamine and the other hydroxy-sulfo-naphthylazo radical is a 2-azo-1-hydroxy-3-sulfo-6-naphthylamine or an azo-sulfo-naphthol containing a single hydroxyl group ortho to the azo group and not more than two sulfo groups, whereby a number of advantages are secured. As employed herein, the term "sulfo" denotes and includes the sulfonic acid radical and its salts (the radical —$SO_3M$, wherein M is hydrogen or a salt-forming cation) and the term "amine" denotes and includes unsubstituted and N-hydrocarbon substituted amines (the radical —NR′R″, wherein each of R′ and R″ is hydrogen or a hydrocarbon radical).

An object of the present invention is to provide improvements in the process of coppering disazo dyestuffs of said class whereby copper-containing dyestuffs having improved dyeing properties are obtained.

A further object of the present invention is to provide improvements in the process of coppering disazo dyestuffs of said class whereby the coppering reaction can be carried out more rapidly or at a lower temperature.

Additional objects of the present invention are to provide improvements in the process of coppering disazo dyestuffs of said class, and especially those unsymmetrical blue disazo dyestuffs in which one of the hydroxy-sulfo-naphthylazo radicals is a 2-azo-1-hydroxy-3-sulfo-6-naphthylamine and the other is a radical of an azo-hydroxy-disulfo-naphthalene in which the azo and hydroxyl groups are in the 1- and 2-positions, and one of the sulfo groups is in the 3-position, of the naphthalene nucleus, whereby copper-containing dyestuffs dyeing cotton brighter shades of blue are obtained; and to provide improvements in the process of coppering such disazo dyestuffs whereby copper-containing dyestuffs dyeing cotton greener shades of blue are obtained.

Other objects of the invention will in part be obvious and will in part appear hereinafter.

It is known to produce copper-containing disazo dyestuffs from disazo dyestuffs of the above type by heating them with a coppering agent until no further color change is produced (see for example U. S. Patent 1,889,732). Coppering agents usually employed include salts of mono- and divalent copper such as cuprous chloride, cupric acetate and cupric sulfate, and especially copper tetrammine compounds obtained by reacting cupric hydroxide or a cupric salt with ammonia or an organic base. The reaction is usually carried out by heating the dyestuff with the coppering agent in an aqueous reaction medium which may contain an alcohol or other solvent. During such treatment the alkyl groups of the alkoxy radicals are split off to form alkylamine, and copper combines with the dyestuff molecule. The chelated copper-containing dyestuffs thus obtained dye cotton blue to reddish blue shades of good fastness properties.

As heretofore practiced, the coppering of disazo dyestuffs of the specific class set out above required heating of the coppering reaction mixture for long periods of time. Moreover, the resulting copper-containing dyestuffs, when employed for dyeing cotton and other cellulosic fibers, gave dyeings which did not have the desired brightness and greenness of shade. The causes of these deficiencies are not known but they are believed to be due, at least in part, to formation of by-products during the coppering reaction which remain as impurities in the copper-containing dyestuffs and which exert a dulling or reddening effect upon the shade of the resulting dyeings.

According to the present invention, the coppering of disazo dyestuffs of the class set out above is carried out in the presence of free morpholine (tetrahydro-1,4-oxazine). Preferably, the coppering is carried out in an aqueous reaction mixture containing an amount of free morpholine equal to at least 3%, and especially at least 5%, of the total weight of morpholine and water in the reaction mixture.

I have discovered that, in the coppering of disazo dyestuffs of the class set out above, when morpholine is added to the usual coppering reaction mixture or when morpholine is substituted for the ammonia or other organic base in an amount providing for the presence of free morpholine in the coppering reaction mixture, the coppering reaction is improved and improved dyeings are obtained with the resulting copper-containing dyestuffs. Thus, as compared with known coppering processes wherein the same dyestuffs are heated with an ammoniacal copper solution (e. g. ammoniacal copper sulfate) or a copper salt (e. g. copper sulfate) and excess pyridine, I have found that the presence of free morpholine in the reaction mixture permits the coppering reaction to proceed faster and at a lower temperature, and that the resulting copper-containing dyestuffs dye cotton and other cellulosic fibers shades which are generally greener and brighter without impairment of their fastness properties. In some cases, the copper-containing dyestuffs have improved solubility in the dyebath and are obtained in greater yield.

While the reason for the beneficial action of morpholine in the coppering of the dyestuffs of the specific class to the coppering of which the invention relates is not known, I believe that the morpholine permits a more complete cleavage of the alkyl groups from the alkoxy radicals, with the consequent production of purer and more completely coppered dyestuffs.

This unique and beneficial action of morpholine in the coppering of the above class of disazo dyestuffs is surprising, since the same advantageous results are not secured when the coppering is carried out with a large excess of ammonia or pyridine, or with pyridine and ammonia, in the absence of morpholine; and the presence of free morpholine in the coppering reaction mixture does not have these beneficial effects when other closely related dyestuffs of the 3,3′-dialkoxy-4,4′-bis(hydroxy-sulfo-naphthylazo)-biphenyl type are subjected to the coppering treatment. It is no more beneficial than the addition of pyridine, for example. Thus, essentially the same results are obtained, whether free morpholine is added or omitted, in the coppering of the unsymmetrical disazo dyestuff resulting from the coupling in alkaline medium of tetrazotized o,o'-dianisidine with one molecular equivalent of 1-amino-8-hydroxy-naphthalene-2,4-disulfonic acid and one molecular equivalent of 1-hydroxy-naphthalene-3,8-disulfonic acid, and in the coppering of the symmetrical disazo dyestuff resulting from the coupling in alkaline medium of tetrazotized o,o'-dianisidine with two molecular equivalents of 1-benzamido-8-hydroxy-naphthalene-2,4-disulfonic acid.

When disazo dyestuffs of the specific class set out above are subjected to coppering in the known manner, an initial reaction product of the dyestuff and the coppering agent is formed, which is difficultly soluble in the reaction medium but which gradually goes into solution as the alkyl groups are split off from the alkoxy radicals. If the coppering reaction is carried out in the presence of free morpholine in accordance with the present invention, the initial reaction product shows unexpectedly superior solubility in the reaction medium. This beneficial action of free morpholine occurs regardless of whether the coppering agent is derived from ammonia or from another organic base (e. g. pyridine) or from morpholine itself. Whether the morpholine acts by chemical combination or in some other way is not known. Presumably, this solubilizing action is responsible, at least in part, for the beneficial effect of morpholine on the coppering reaction and the superior properties of the resulting copper-containing dyestuffs. It is to be understood, however, that my invention is not limited to any particular theoretical considerations or theory of operation.

In carrying out the coppering process in accordance with the present invention, morpholine is added to the usual coppering reaction mixture, or morpholine is employed instead of ammonia or other organic base, in the known coppering processes. The amount of morpholine employed is at least sufficient to provide for the presence of free morpholine in the reaction mixture, preferably in sufficient concentration to produce a distinct modifying action on the coppering process. The coppering reaction is continued until the alkyl groups are split off from the alkoxy radicals and formation of the copper-containing dyestuff is completed.

In carrying out the coppering process in accordance with the preferred procedure, the disazo dyestuff to be coppered is heated in an aqueous reaction medium with a coppering agent and an amount of free morpholine equal to at least 3%, and especially at least 5%, of the total weight of morpholine and water in the reaction mixture. Generally, amounts greater than 20% of free morpholine, based on the total weight of morpholine and water in the reaction mixture, are not required but may be employed if desired.

The reaction mixture, which may contain an alcohol (e. g. ethyl alcohol) or other conventional additions, may be heated in the known manner to effect the reaction. Thus, it may be heated in a reflux apparatus at temperatures of 80° C. and above, for example, the boiling point at ordinary atmospheric pressure, or higher temperatures (e. g. 100° to 125° C.) at superatmospheric pressures. Completion of the coppering reaction (cleavage of the alkoxy radicals and formation of the copper-containing dyestuff) is generally indicated when no further color change occurs on continued heating of the reaction mixture. The resulting copper-containing dyestuff may be isolated in any suitable manner, e. g. by salting out from the reaction mixture or in other known manner.

Any of the usual coppering agents suitable for forming complex copper compounds with o,o'-dihydroxy azo dyestuffs may be employed in carrying out the coppering in accordance with the present invention, as for example, salts and especially water-soluble salts of mono-and divalent copper (e. g., cuprous chloride, cupric acetate or cupric sulfate) and copper tetrammine compounds, especially water-soluble copper tetrammine compounds obtained, for example, by reacting cupric hydroxide or a cupric salt with ammonia or an organic base (e. g., methylamine, ethylamine, pyridine, piperidine, pyrrole or pyrrolidine). Morpholine itself may be used as a component of the copper tetramine compound and, when a copper salt but no other organic base or ammonia is used, the morpholine combines with the copper salt to form the tetrammine compound. In the latter case, a sufficient excess of morpholine to provide for the presence of free morpholine in the reaction mixture is employed.

The improved process of the present invention is applicable for the coppering of various dyestuffs of the above specific class of disazo dyestuffs. Thus, suitable dyestuffs include symmetrical disazo dyestuffs in which both of the hydroxy-sulfo-naphthylazo radicals are the same 2-azo-1-hydroxy-3-sulfo-6-naphthylamine, and unsymmetrical disazo dyestuffs in which one of the hydroxy-sulfo-naphthylazo radicals is one 2-azo-1-hydroxy-3-sulfo-6-naphthylamine (e. g. 6-amino-2-azo-1-hydroxy-3-sulfo-naphthalene) and the other hydroxy-sulfo-naphthylazo radical is another 2-azo-1-hydroxy-3-sulfo-6-naphthylamine (e. g., 6-phenylamino-2-azo-1-hydroxy-3-sulfo-naphthalene), as well as unsymmetrical diasazo dyestuffs in which one of the hydroxy-sulfo-naphthylazo radicals is a 2-azo-1-hydroxy-3-sulfo-6-naphthylamine and the other is an azo-sulfo-naphthol containing a single hydroxyl group ortho to the azo group and not more than two sulfo groups. The invention is of particular importance in connection with the coppering of disazo dyestuffs of the above class in which one of the hydroxy-sulfo-naphthylazo radicals is a 2-azo-1-hydroxy-3-sulfo-6-naphthylamine (in which the amine radical is an amino group or a hydrocarbon substituted amino group) and the other hydroxy-sulfo-napthylazo radical is an azo-hydroxy-disulfo-napthalene in which the azo and hydroxyl groups are in the 1- and 2-positions (in either order, that is, respectively in the 1- and 2-positions or in the 2- and 1-positions) of the naphthalene nucleus and one of the sulfo groups is in the 3-position of the naphthalene nucleus.

Disazo dyestuffs of the above class are obtainable in the known manner, for example by coupling a tetrazotized 4,4'-diamino-3,3'-dialkoxy-biphenyl in alkaline medium, and in any sequence, with (a) Two molecular proportions of a coupling component selected from the group consisting of 2-amino-5-hydroxy-naphthalene -7-sulfonic acid and its N-hydrocarbon substituted derivatives (e. g., its N-phenylamino and N-methylamino derivatives), (b) One molecular proportion of each of two different coupling components selected from the aforesaid group, or (c) One molecular proportion of a coupling component selected from the aforesaid group and one molecular proportion of a mono-hydroxy-naphthalene-mono- or disulfonic acid which couples ortho to the hydroxyl group (e. g., 1-hydroxy-naphthalene-4-sulfonic acid, 2-hydroxy-naphthalene-4-sulfonic acid, 2-hydroxy-naphthalene-6-sulfonic acid, 1-hydroxy-naphthalene-3,6-disulfonic acid, 1-hydroxy-naphthalene-3,8-disulfonic acid, 2-hydroxy-naphthalene-3,6-disulfonic acid).

The alkyl groups of the 3,3'-dialkoxy radicals of said class of dyestuffs, and of the tetrazotized 4,4'-diamino-3,3'-dialkoxy-biphenyls from which they are obtainable, are advantageously lower alkyl groups (e. g. methyl or ethyl). Preferably they are 3,3'-dimethoxy-biphenyl compounds.

The invention will be illustrated by the following specific examples, but it is to be understood that it is not limited to the details thereof and that changes may be made without departing from the scope of the invention. The temperatures are in degrees centigrade and the parts and percentages are by weight.

Example 1

*Part 1.*—The disazo dyestuff corresponding with the formula

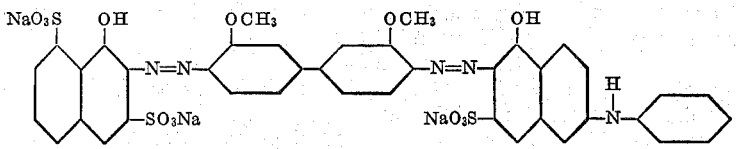

and obtained in the known manner by tetrazotizing 6.1 parts of dianisidine (4,4'-diamino-3,3'-dimethoxybiphenyl) and coupling in alkaline medium with 8 parts of 1-hydroxy-naphthalene-3,8-disulfonic acid and then with 8 parts of 2-phenylamino-5-hydroxynaphthalene-7-sulfonic acid, was slurried with 600 parts of water; 75 parts of morpholine were added, and the resulting slurry was heated to 90°. An ammoniacal copper sulfate solution (a copper tetrammine sulfate solution) prepared from 12.5 parts of copper sulfate ($CuSO_4.5H_2O$), 50 parts of water and 22 parts of 26% aqueous ammonium hydroxide was added, and the resulting reaction mixture was heated at 90° for 14 hours in a reflux apparatus at atmospheric pressure to effect the coppering. After cooling the mixture to 45°, it was salted with 40 parts of common salt, the precipitated copper-containing dyestuff was filtered off, and the filter-cake was washed with about 50 parts of 5% aqueous sodium chloride solution, dried and ground.

The dyestuff thus obtained dyed cotton bright greenish shades of blue having very good fastness properties, especially to light. As compared with the copper-containing dyestuff produced by carrying out the process of this example without the addition of morpholine, it possessed superior solubility in water, was obtained in higher yield, and dyed cotton much greener and brighter shades of blue, even when the coppering in the absence of morpholine was carried out by boiling the reaction mixture for a longer period of time.

*Part 2.*—The coppering was carried out as described in Part 1, but pyridine was substituted for the morpholine. Even when the amount of pyridine used was quadrupled, the resulting copper-containing dyestuff dyed cotton blue shades which were considerably redder and duller than the dyeings obtained with the dyestuff of Part 1.

By substituting for the disazo dyestuff employed as starting material in Example 1, Part 1, the disazo dyestuff obtained by coupling tetrazotized dianisidine in alkaline medium with two molecular proportions of 2-amino-5-hydroxy-naphthalene-7-sulfonic acid or of 2-phenylamino-5-hydroxy-naphthalene-7-sulfonic acid, copper-containing dyestuffs may be obtained having similar superior properties as compared with the dyestuffs obtained by carrying out the coppering in the absence of morpholine but in otherwise similar manner, especially the greener and brighter blue shades which they give on cotton.

Example 2

*Part 1.*—The disazo dyestuff employed in Example 1, obtained from 6.1 parts of dianisidine, 8 parts of 1-hydroxy-naphthalene-3,8-disulfonic acid and 8 parts of 2-phenylamino-5-hydroxy-naphthalene-7-sulfonic acid, was slurried with about 900 parts of water. Then 37.5 parts of morpholine were added, the resulting slurry was heated to 80°, and to it was added an aqueous morpholine-copper sulfate solution (a morpholine-copper tetrammine sulfate solution) prepared by dissolving 12.5 parts of copper sulfate ($CuSO_4.5H_2O$) in 50 parts of water and adding 25 parts of morpholine. The mixture thus obtained was boiled and refluxed for 20 hours at atmospheric pressure to complete the coppering reaction, after which it was salted with sodium chloride (to 5% NaCl concentration), cooled to room temperature and filtered. The filter cake was dried and ground.

The copper-containing dyestuff thus obtained dyed cotton bright more greenish shades of blue than those produced by the dyestuff of Example 1, Part 1.

*Part 2.*—When the process of Part 1 of this example was repeated but without the presence of free morpholine (no morpholine in addition to that present in the morpholine-copper tetrammine sulfate solution) the resulting copper-containing dyestuff dyed cotton much redder and duller shades of blue.

Example 3

*Part 1.*—Sixty-four parts of a press cake obtained in the known manner by alkaline coupling of tetrazotized dianisidine (from 7.3 parts of dianisidine) with one molecular equivalent (10.6 parts) of 2-hydroxy-naphthalene-3,6-disulfonic acid and one molecular equivalent (10.2 parts) of 2-phenylamino-5-hydroxy-naphthalene-7-sulfonic acid, and containing about 28 parts of the dyestuff corresponding with the formula

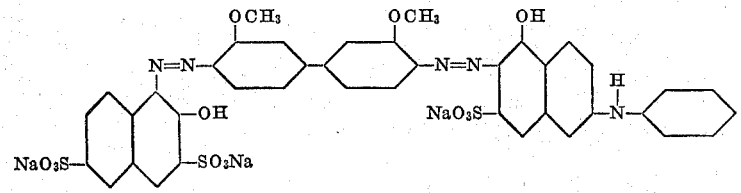

were mixed with 720 parts of water, 2 parts of sulfonated castor oil and 25 parts of morpholine, and the mixture was heated to 90°. Then an ammoniacal copper sulfate solution prepared by adding 18 parts of 26% aqueous ammonia to 15 parts of copper sulfate ($CuSO_4.5H_2O$) dissolved in 60 parts of water was added and the resulting mass was boiled and refluxed at atmospheric pressure for 14 hours to complete the coppering reaction. The reaction mixture was salted with 96 parts of sodium chloride, cooled to 40°, and filtered, and the filter cake was dried and ground.

The dyestuff thus obtained possessed excellent solubility in water and dyed cotton bright greenish shades of blue having very good fastness properties, especially to light. It dyed cotton much greener and brighter shades of blue than the dyestuff obtained by carrying out the coppering in the absence of morpholine but otherwise the same manner.

*Part 2.*—The process of Part 1 of this example was repeated using 100 parts of pyridine in place of the morpholine. The resulting copper-containing dyestuff possessed much inferior solubility in water and dyed cotton redder and duller blue shades than the copper-containing dyestuff produced by the process of Part 1.

It will be evident to those skilled in the art that the invention is not limited to the details of the foregoing illustrative examples and that changes can be made without departing from the scope of the invention.

Thus, in the process of above Example 1, Part 1, the ammonia can be replaced by a corresponding amount of an organic base, such as pyridine, piperidine, pyrrole or pyrrolidine. The resulting dyestuffs dye cotton bright shades of blue which are even greener than those produced by the dyestuff of Example 1, Part 1.

Instead of copper sulfate, other copper salts may be employed in the processes of the above examples, e. g. copper acetate or cupric chloride.

In addition, other changes can be made, as indicated above. Accordingly it will be understood that the description should be interpreted as illustrative and not in a limiting sense.

I claim:

1. The process of producing a copper-containing disazo dyestuff which comprises heating a blue unsymmetrical disazo dyestuff which is a 3,3'-dimethoxy-4,4'-bis(hydroxy-sulfo-naphthylazo)-biphenyl in which one of the hydroxy-sulfo-naphthylazo radicals is 2-azo-1-hydroxy-6-phenyl-amino-3-sulfo-naphthalene and the other hydroxy-sulfo-naphthylazo radical is an azo-sulfo-naphthol containing a single hydroxyl group ortho to the azo group and not more than two sulfo groups as the sole substituent with a water-soluble copper tetramine compound in an aqueous reaction medium containing free morpholine in an amount equal to 3% to 20% of the total weight of morpholine and water in the reaction medium, whereby the alkyl groups of the alkoxy radicals are split off and a copper-containing dyestuff is formed.

2. The process of producing a copper-containing disazo dyestuff which comprises heating a blue unsymmetrical disazo dyestuff which is a 3,3'-dimethoxy-4,4'-bis(hydroxy-sulfo-naphthylazo)-biphenyl in which one of the hydroxy-sulfo-naphthylazo radicals is 2-azo-1-hydroxy-6-phenylamino-3-sulfo-naphthalene and the other hydroxy-sulfo-naphthylazo radical is an azo-hydroxy-disulfo-naphthalene having the hydroxy group ortho to the azo group with a water-soluble copper tetrammine compound in an aqueous reaction medium containing free morpholine in an amount equal to 3% to 20% of the total weight of morpholine and water in the reaction medium, whereby the alkyl groups of the alkoxy radicals are split off and a copper-containing dyestuff is formed.

3. The process defined in claim 2 wherein the water-soluble copper tetrammine compound is a morpholine-copper tetrammine compound.

4. The process defined in claim 2 wherein the azo-hydroxy-disulfo-naphthalene radical is 2-azo-1-hydroxy-3,8-disulfo-naphthalene.

5. The process defined in claim 2 wherein the azo-hydroxy-disulfo-naphthalene radical is 1-azo-2-hydroxy-3,6-disulfo-naphthalene.

6. The process of producing a copper-containing disazo dyestuff which comprises heating a blue disazo dyestuff which is a 3,3'-dimethoxy-4,4'-bis(hydroxy-sulfo-naphthylazo)-biphenyl in which one of the hydroxy-sulfo-naphthylazo radicals is 2-azo-1-hydroxy-6-phenylamino-3-sulfo-naphthalene and the other hydroxy-sulfo-naphthylazo radical is an azo-hydroxy-disulfo-naphthalene in which the azo and hydroxyl groups are in the 1- and 2-positions, and one of the sulfo groups is in the 3-position, of the naphthalene nucleus with a water-soluble copper tetrammine compound in an aqueous reaction medium containing free morpholine in an amount equal to 5% to 20% of the total weight of morpholine and water in the reaction medium, whereby the alkyl groups of the alkoxy radicals are split off and a copper-containing dyestuff is formed.

7. The process defined in claim 6 wherein the azo-hydroxy-disulfo-naphthalene radical is 2-azo-1-hydroxy-3,8-disulfo-naphthalene.

8. The process defined in claim 6 wherein the water-soluble copper tetrammine compound is morpholine-copper tetrammine sulfate.

References Cited in the file of this patent

UNITED STATES PATENTS

| | | |
|---|---|---|
| 1,889,732 | Stusser et al. | Nov. 29, 1932 |
| 1,940,066 | Stusser | Dec. 19, 1933 |
| 2,553,011 | Schedler et al. | May 15, 1951 |
| 2,590,346 | Riat et al. | Mar. 25, 1952 |
| 2,630,431 | Trepagnier | Mar. 3, 1953 |